(12) United States Patent
Sun et al.

(10) Patent No.: US 12,532,551 B2
(45) Date of Patent: Jan. 20, 2026

(54) VISIBLE LIGHT COMMUNICATION DEVICE, DISPLAY SUBSTRATE, DISPLAY DEVICE AND MANUFACTURING METHOD OF THE DISPLAY SUBSTRATE

(71) Applicant: BOE Technology Group Co., Ltd., Beijing (CN)

(72) Inventors: Zhongyuan Sun, Beijing (CN); Weijie Wang, Beijing (CN); Rui Huang, Beijing (CN); Renquan Gu, Beijing (CN); Yujie Liu, Beijing (CN); Biqi Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 478 days.

(21) Appl. No.: 17/926,963

(22) PCT Filed: Dec. 10, 2021

(86) PCT No.: PCT/CN2021/137037
§ 371 (c)(1),
(2) Date: Nov. 21, 2022

(87) PCT Pub. No.: WO2023/102888
PCT Pub. Date: Jun. 15, 2023

(65) Prior Publication Data
US 2024/0244854 A1 Jul. 18, 2024

(51) Int. Cl.
*H10F 39/10* (2025.01)
*H10F 30/223* (2025.01)
(Continued)

(52) U.S. Cl.
CPC ........ *H10F 30/223* (2025.01); *H10F 39/016* (2025.01); *H10F 39/107* (2025.01);
(Continued)

(58) Field of Classification Search
None
See application file for complete search history.

(56) References Cited

U.S. PATENT DOCUMENTS

2003/0178630 A1 9/2003 Maruyama
2006/0252171 A1 11/2006 Lee et al.
(Continued)

FOREIGN PATENT DOCUMENTS

CN 1445866 A 10/2003
CN 1519957 A 8/2004
(Continued)

*Primary Examiner* — Zandra V Smith
*Assistant Examiner* — Molly K Reida
(74) *Attorney, Agent, or Firm* — IPro, PLLC (57) ABSTRACT

The present disclosure provides a visible light communication device, a display substrate, a display device, and a manufacturing method of the display substrate. The visible light communication device includes: a protrusion structure arranged on a base substrate and protruding toward a photosensitive side of the visible light communication device; a first electrode covering the protrusion structure; a visible light sensing layer arranged at a side of the first electrode away from the protrusion structure; and a second electrode arranged at a side of the visible light sensing layer away from the first electrode. A surface of each of the first electrode, the visible light sensing layer and the second electrode away from the base substrate is provided with a protrusion facing the photosensitive side of the visible light communication device due to the protrusion structure.

8 Claims, 6 Drawing Sheets

(51) Int. Cl.
    *H10F 39/00*     (2025.01)
    *H10F 55/00*     (2025.01)
    *H10F 77/40*     (2025.01)
    *H10F 77/70*     (2025.01)

(52) U.S. Cl.
    CPC ........... *H10F 55/18* (2025.01); *H10F 77/407* (2025.01); *H10F 77/707* (2025.01)

(56) References Cited

U.S. PATENT DOCUMENTS

| | | | |
|---|---|---|---|
| 2017/0236857 A1 | 8/2017 | Bu | |
| 2019/0005295 A1 | 1/2019 | Jia et al. | |
| 2019/0165017 A1 | 5/2019 | Qin et al. | |
| 2020/0350374 A1* | 11/2020 | Yuan | H10F 10/17 |
| 2021/0336071 A1 | 10/2021 | Huang | |
| 2022/0246695 A1* | 8/2022 | Liu | G06V 40/1318 |
| 2022/0344405 A1 | 10/2022 | Zhu et al. | |

FOREIGN PATENT DOCUMENTS

| | | | | |
|---|---|---|---|---|
| CN | 102592520 A | 7/2012 | | |
| CN | 102592543 A | 7/2012 | | |
| CN | 202443212 U | 9/2012 | | |
| CN | 105140250 A | 12/2015 | | |
| CN | 106611170 A | 5/2017 | | |
| CN | 107968100 A | 4/2018 | | |
| CN | 111341808 A | 6/2020 | | |
| CN | 113591676 A | 11/2021 | | |
| WO | WO-2021238492 A1 * | 12/2021 | ........... | G06V 10/141 |

* cited by examiner

VISIBLE LIGHT COMMUNICATION DEVICE, DISPLAY SUBSTRATE, DISPLAY DEVICE AND MANUFACTURING METHOD OF THE DISPLAY SUBSTRATE

CROSS-REFERENCE TO RELATED APPLICATION

This application is the U.S. national phase of PCT Application No. PCT/CN2021/137037 filed on Dec. 10, 2021, the entire contents of which are hereby incorporated by reference.

TECHNICAL FIELD

The present disclosure relates to the field of visible light communication technology, in particular to a visible light communication device, a display substrate, a display device and a manufacturing method of the display substrate.

BACKGROUND

There are many disadvantages for a radio signal transmission device, e.g., it is rare and expensive but inefficient. For example, for mobile phones, millions of base stations around the world are used to enhance their signals, but most of energy is spent on cooling, and the efficiency is only 5%. In contrast, visible light communication (VLC) is a new wireless transmission technology where data is transmitted using a visible light spectrum, e.g., light-emitting diodes (LEDs), so it is able to achieve nearly zero energy communication and effectively avoid weaknesses of radio communication such as electromagnetic signal leakage. As a result, the visible light communication has attracted more and more attentions.

Figure 1:
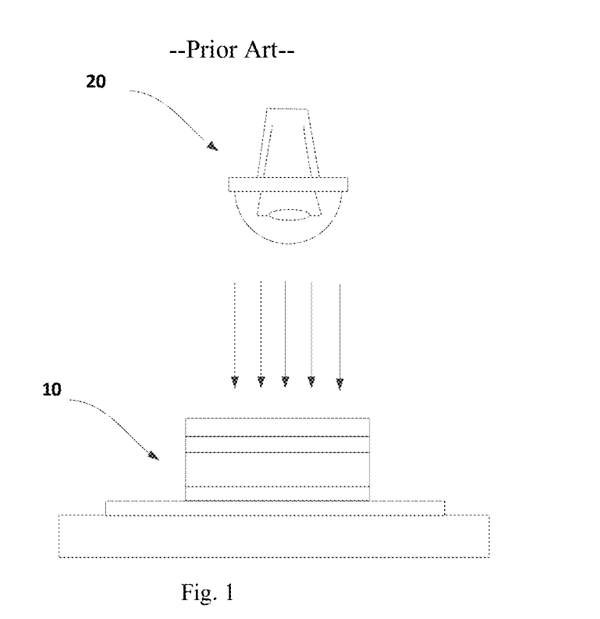
FIG. 1 is a schematic view showing a situation where a light signal is received by a conventional visible light communication device.
Figure 2:
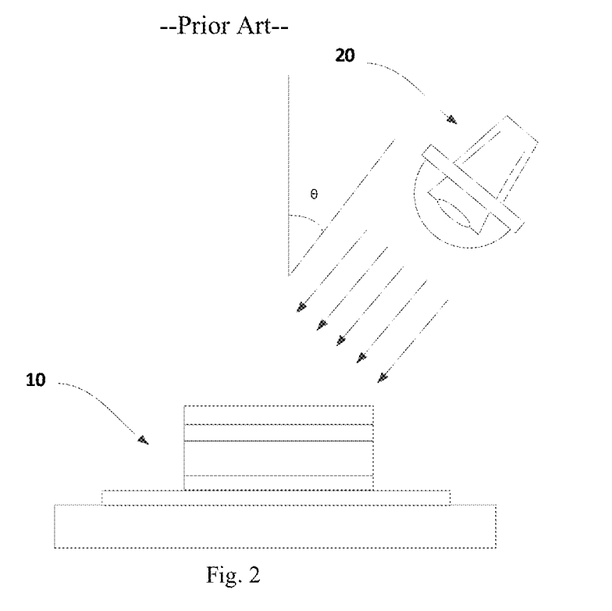
FIG. 2 is another schematic view showing the situation where the light signal is received by the conventional visible light communication device.

As shown in FIG. 1, photosensitive film layers of a conventional visible light communication device 10 are provided with a planar laminated structure, so the photosensitive film layers have a strong ability to receive signals from a light signal source 20 directly facing the photosensitive film layers. When the light signal source 20 deflects by a certain angle θ, a light path among the film layers of the visible light communication device changes, refraction of the light signals is enhanced, and strength of the signals received by the visible light communication device 10 is remarkably reduced, resulting in poor communication.

SUMMARY

An object of the present disclosure is to provide a visible light communication device, a display substrate, a display device and a manufacturing method of the display substrate, so as to solve the problem in the art where the poor communication occurs when the photosensitive film layers of the visible light communication device are provided with the planar laminated structure and the strength of the signals received by the visible light communication device is remarkably reduced after the light signal source deflects by a certain angle.

In order to solve the above technical problems, the present disclosure provides the following technical solutions.

In one aspect, the present disclosure provides in some embodiments a visible light communication device, including: a base substrate; a protrusion structure arranged on the base substrate and protruding toward a photosensitive side of the visible light communication device; a first electrode covering the protrusion structure; a visible light sensing layer arranged at a side of the first electrode away from the protrusion structure; and a second electrode arranged at a side of the visible light sensing layer away from the first electrode. A surface of each of the first electrode, the visible light sensing layer and the second electrode away from the base substrate is provided with a protrusion facing the photosensitive side of the visible light communication device due to the protrusion structure.

In a possible embodiment of the present disclosure, the protrusion structure is a spherical protrusion structure or a boss structure.

In a possible embodiment of the present disclosure, the spherical protrusion structure is one of a hemi-spherical structure, a spherical segment structure, a hemi-ellipsoidal structure, or an ellipsoidal segment structure.

In a possible embodiment of the present disclosure, an orthogonal projection of a surface of the boss structure away from the base substrate onto the base substrate is located in an orthogonal projection of a surface of the boss structure close to the base substrate onto the base substrate, and a size of the surface of the boss structure away from the base substrate is less than a size of the surface of the boss structure close to the base substrate.

In a possible embodiment of the present disclosure, the visible light communication device further includes a covering layer covering the surface of the second electrode, a side surface of the second electrode and a side surface of the visible light sensing layer.

In another aspect, the present disclosure provides in some embodiments a display substrate, including: a base substrate including a visible light sensing region; and a visible light communication device arranged in the visible light sensing region, and including: a protrusion structure arranged on the base substrate and protruding toward a photosensitive side of the visible light communication device; a first electrode covering the protrusion structure; a visible light sensing layer arranged at a side of the first electrode away from the protrusion structure; and a second electrode arranged at a side of the visible light sensing layer away from the first electrode. A surface of each of the first electrode, the visible light sensing layer and the second electrode away from the base substrate is provided with a protrusion facing the photosensitive side of the visible light communication device due to the protrusion structure.

In a possible embodiment of the present disclosure, the protrusion structure is a spherical protrusion structure or a boss structure.

In a possible embodiment of the present disclosure, the spherical protrusion structure is one of a hemi-spherical structure, a spherical segment structure, a hemi-ellipsoidal structure, or an ellipsoidal segment structure.

In a possible embodiment of the present disclosure, an orthogonal projection of a surface of the boss structure away from the base substrate onto the base substrate is located in an orthogonal projection of a surface of the boss structure close to the base substrate onto the base substrate, and a size of the surface of the boss structure away from the base substrate is less than a size of the surface of the boss structure close to the base substrate.

In a possible embodiment of the present disclosure, the base substrate further includes a display region, the display region includes a plurality of sub-pixel regions, and the visible light sensing region surrounds the display region.

In a possible embodiment of the present disclosure, the base substrate further includes a display region, the display region includes a plurality of sub-pixel regions, and at least a part of the sub-pixel regions include the visible light sensing region.

In a possible embodiment of the present disclosure, the display substrate further includes: a thin film transistor arranged in the sub-pixel region and including an active layer, a gate insulation layer, a gate electrode, an interlayer dielectric layer, a source electrode and a drain electrode; a passivation layer arranged at a side of the thin film transistor away from the base substrate; a planarization layer arranged at a side of the passivation layer away from the base substrate; and a pixel electrode arranged at a side of the planarization layer away from the base substrate and coupled to the source electrode through a via hole in the passivation layer and the planarization layer. The first electrode is arranged at a same layer and made of a same material as the source electrode and the drain electrode.

In a possible embodiment of the present disclosure, the visible light communication device further includes a covering layer covering the surface of the second electrode, a side surface of the second electrode and a side surface of the visible light sensing layer, and the covering layer is arranged at a same layer and made of a same material as the passivation layer.

In a possible embodiment of the present disclosure, the visible light communication device further includes a second electrode line arranged at a side of the planarization layer away from the base substrate and coupled to the second electrode through the via hole in the planarization layer. The second electrode line is arranged at a same layer and made of a same material as the pixel electrode.

In yet another aspect, the present disclosure provides in some embodiments a display device including the above-mentioned display substrate.

In still yet another aspect, the present disclosure provides in some embodiments a method for manufacturing a display substrate, including: providing a base substrate, the base substrate including a visible light sensing region; and forming a visible light communication device in the visible light sensing region of the base substrate, the visible light communication device including: a protrusion structure arranged on the base substrate and protruding toward a photosensitive side of the visible light communication device; a first electrode covering the protrusion structure; a visible light sensing layer arranged at a side of the first electrode away from the protrusion structure; and a second electrode arranged at a side of the visible light sensing layer away from the first electrode. A surface of each of the first electrode, the visible light sensing layer and the second electrode away from the base substrate is provided with a protrusion facing the photosensitive side of the visible light communication device due to the protrusion structure.

In a possible embodiment of the present disclosure, the protrusion structure is a spherical protrusion structure, and the forming the protrusion structure includes: coating a spacer layer material on a whole surface of an interlayer dielectric layer; forming a spacer layer material pattern in the visible light sensing region through exposure and developing; and enabling the spacer layer material pattern to flow through a heating process to form the protrusion structure.

According to the embodiments of the present disclosure, the protrusion structure is arranged at a side of the photosensitive film layers of the visible light communication device, so as to form the protrusions facing the photosensitive side of the visible light communication device on the photosensitive film layers of the visible light communication device, minimize an angle difference between a light signal in each direction and each photosensitive film layer of the visible light communication device, and prevent the occurrence of a decrease in strength of received signals due to a deflection angle θ of a light signal source, thereby to improve the signal receiving capability of the visible light communication device.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

Figure 3:
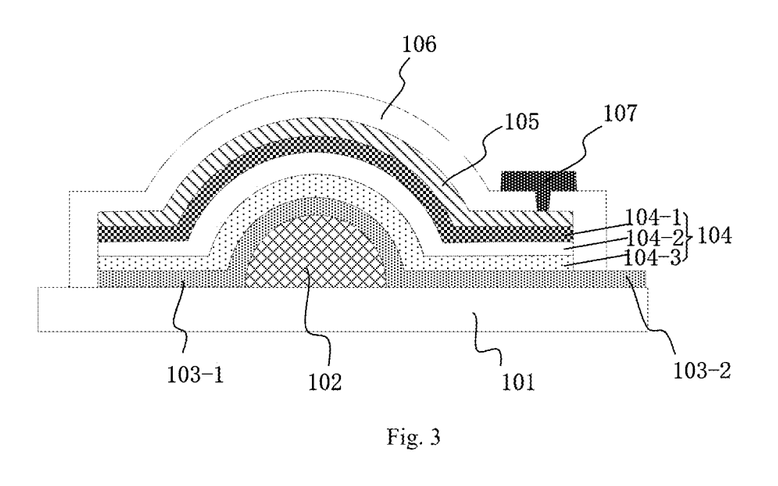
FIG. 3 is a schematic view showing a visible light communication device according to one embodiment of the present disclosure.

As shown in FIG. 3, the present disclosure provides in some embodiments a visible light communication device, which includes: a base substrate 101, e.g., a glass substrate or a polyimide (PI) substrate; a protrusion structure 102 arranged on the base substrate 101 and protruding toward a photosensitive side of the visible light communication device; a first electrode (BE) 103 covering the protrusion structure 102; a visible light sensing layer 104 arranged at a side of the first electrode 103-1 away from the protrusion structure 102; and a second electrode (TE) 105 arranged at a side of the visible light sensing layer 104 away from the first electrode 103-1. A surface of each of the first electrode 103-1, the visible light sensing layer 104 and the second electrode 105 away from the base substrate 101 is provided with a protrusion facing the photosensitive side of the visible light communication device due to the protrusion structure 102.

In the embodiments of the present disclosure, due to the protrusion structure, the first electrode 103-1, the visible light sensing layer 104 and the second electrode 105 are formed through a sputtering process or a vapor deposition process so that the film layers cover the protrusion structure in a shape-following manner. Hence, the surface of each of the first electrode 103-1, the visible light sensing layer 104 and the second electrode 105 away from the base substrate 101 is provided with a protrusion facing the photosensitive side of the visible light communication device.

In the embodiments of the present disclosure, the protrusion structure is arranged at a side of the photosensitive film layers of the visible light communication device, so as to form the protrusions facing the photosensitive side of the visible light communication device on the photosensitive film layers of the visible light communication device, minimize an angle difference between a light signal in each direction and each photosensitive film layer of the visible light communication device, and prevent the occurrence of a decrease in strength of received signals due to a deflection angle $\theta$ of a light signal source, thereby to improve the signal receiving capability of the visible light communication device.

In the embodiments of the present disclosure, the first electrode is made of an opaque material such as metal, and the second electrode is a transparent electrode and made of a transparent conductive material such as indium tin oxide (ITO).

In a possible embodiment of the present disclosure, as shown in FIG. 3, the visible light sensing layer 104 includes an N-type doped layer 104-1, an intrinsic layer 104-2 and a p-type doped layer 104-3. The N-type doped layer 104-1, the intrinsic layer 104-2 and the p-type doped layer 104-3 are collectively called as a PIN element.

In a possible embodiment of the present disclosure, the protrusion structure is a spherical protrusion structure, and the spherical protrusion structure is one of a hemi-spherical structure (as shown in FIG. 3), a spherical segment structure, a hemi-ellipsoidal structure, or an ellipsoidal segment structure.

In a possible embodiment of the present disclosure, the protrusion structure 102 is made of a photolithographic organic material such as acrylic resin, or epoxy resin. The photolithographic organic material is formed into a spherical protrusion structure such as a hemi-spherical structure, a spherical segment structure, a hemi-ellipsoidal structure, and an ellipsoidal segment structure, through exposure and then heating.

Figure 4:
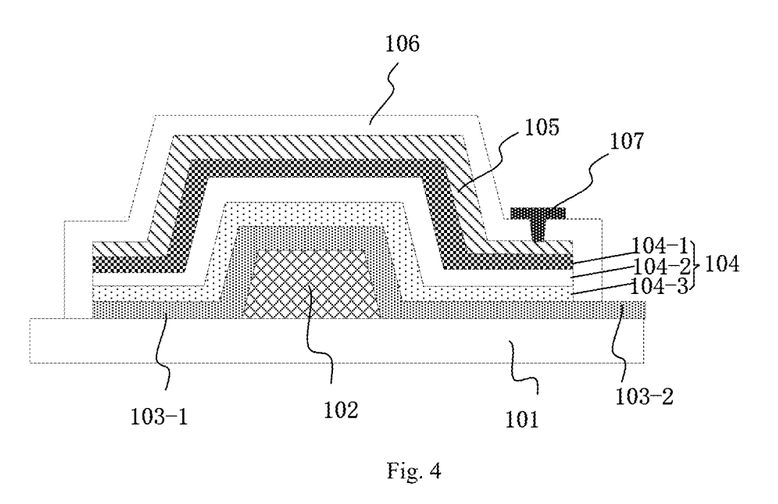
FIG. 4 is another schematic view showing the visible light communication device according to one embodiment of the present disclosure.

In some embodiments of the present disclosure, the protrusion structure 102 may also be a boss structure, as shown in FIG. 4. The boss structure is a truncated pyramid or a truncated cone. In a possible embodiment of the present disclosure, the protrusion structure 102 is made of a photosensitive organic material, and it is formed directly through a photolithography process.

In the embodiments of the present disclosure, an orthogonal projection of a surface of the boss structure away from the base substrate onto the base substrate is located in an orthogonal projection of a surface of the boss structure close to the base substrate onto the base substrate, and a size of the surface of the boss structure away from the base substrate is less than a size of the surface of the boss structure close to the base substrate, so as to provide each photosensitive film layer with a shape for receiving light signals in each direction in an easier manner.

In a possible embodiment of the present disclosure, as shown in FIG. 3 and FIG. 4, the visible light communication device further includes a covering layer 106 covering the surface of the second electrode 105, a side surface of the second electrode 105 and a side surface of the visible light sensing layer 104, so as to protect each film layer in a better manner.

In a possible embodiment of the present disclosure, as shown in FIG. 3 and FIG. 4, the visible light communication device further includes a second electrode line 107 coupled to the second electrode 105 though a via hole penetrating through the covering layer 106.

In a possible embodiment of the present disclosure, the visible light communication device further includes a first electrode line 103-2 coupled to the first electrode 103-1, as shown in FIG. 3 and FIG. 4, and the first electrode line 103-2 is coupled to a part of the first electrode 103-1 not covered by the covering layer 106.

Through the integration of a communication function and a display function, a display screen is used as not only a display port but also a communication port, which is another innovative breakthrough in the field of VLC and display.

Figure 5:
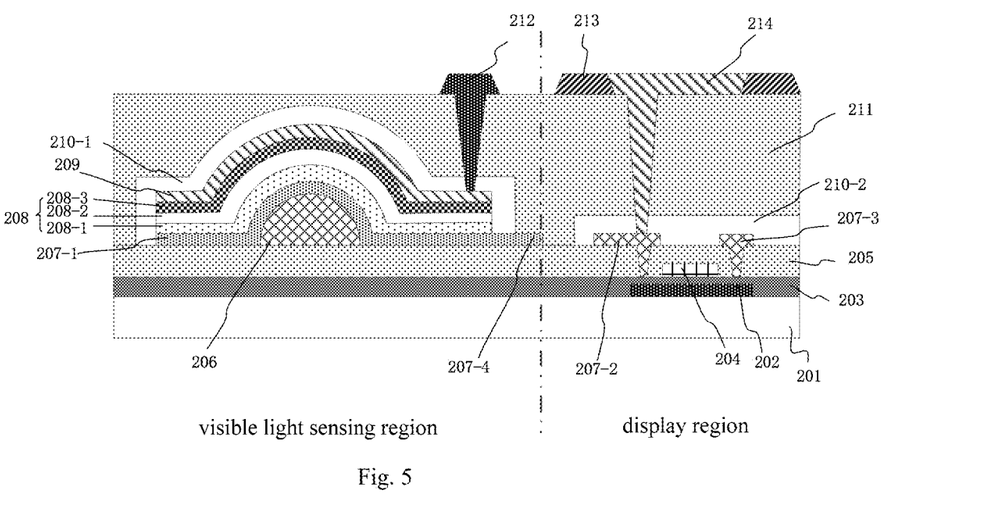
FIG. 5 is a schematic view showing a display substrate according to one embodiment of the present disclosure.

As shown in FIG. 5, the present disclosure further provides in some embodiments a display substrate, which includes: a base substrate 201 including a visible light sensing region; and a visible light communication device arranged in the visible light sensing region, and including: a protrusion structure 206 arranged on the base substrate 201 and protruding toward a photosensitive side of the visible light communication device; a first electrode 207-1 covering the protrusion structure 206; a visible light sensing layer 208 arranged at a side of the first electrode 207-1 away from the protrusion structure 206; and a second electrode 209 arranged at a side of the visible light sensing layer 208 away from the first electrode 207-1. A surface of each of the first electrode 207-1, the visible light sensing layer 208 and the second electrode 209 away from the base substrate 201 is provided with a protrusion facing the photosensitive side of the visible light communication device due to the protrusion structure 206.

In the embodiments of the present disclosure, due to the protrusion structure, the first electrode 207-1, the visible light sensing layer 208 and the second electrode 209 are formed through a sputtering process or a vapor deposition process so that the film layers cover the protrusion structure in a shape-following manner, and the surface of each of the first electrode 207-1, the visible light sensing layer 208 and the second electrode 209 away from the base substrate 201 is provided with a protrusion facing the photosensitive side of the visible light communication device. In the embodiments of the present disclosure, the protrusion structure is arranged at a side of the photosensitive film layers of the visible light communication device, so as to form the protrusions facing the photosensitive side of the visible light communication device on the photosensitive film layers of the visible light communication device, minimize an angle difference between a light signal in each direction and each photosensitive film layer of the visible light communication device, and prevent the occurrence of a decrease in strength of received signals due to a deflection angle $\theta$ of a light signal source, thereby to improve the signal receiving capability of the visible light communication device.

In the embodiments of the present disclosure, the first electrode is made of an opaque material such as metal, and the second electrode is a transparent electrode and made of a transparent conductive material such as ITO.

In a possible embodiment of the present disclosure, as shown in FIG. 3, the visible light sensing layer 208 includes an N-type doped layer 208-1, an intrinsic layer 208-2 and a P-type doped layer 208-3, and the N-type doped layer 208-1, the intrinsic layer 208-2 and the P-type doped layer 208-3 may be collectively referred to as a PIN element.

In a possible embodiment of the present disclosure, the protrusion structure is a spherical protrusion structure, and the spherical protrusion structure is one of a hemi-spherical structure (as shown in FIG. 5), a spherical segment structure, a hemi-ellipsoidal structure, and an ellipsoidal segment structure.

In a possible embodiment of the present disclosure, the protrusion structure 206 is made of a photolithographic organic material such as acrylic resin, or epoxy resin, and the photolithographic organic material is formed into a spherical protrusion structure such as a hemi-spherical structure, a spherical segment structure, a hemi-ellipsoidal structure and an ellipsoidal segment structure, through exposure and then heating.

Figure 7:
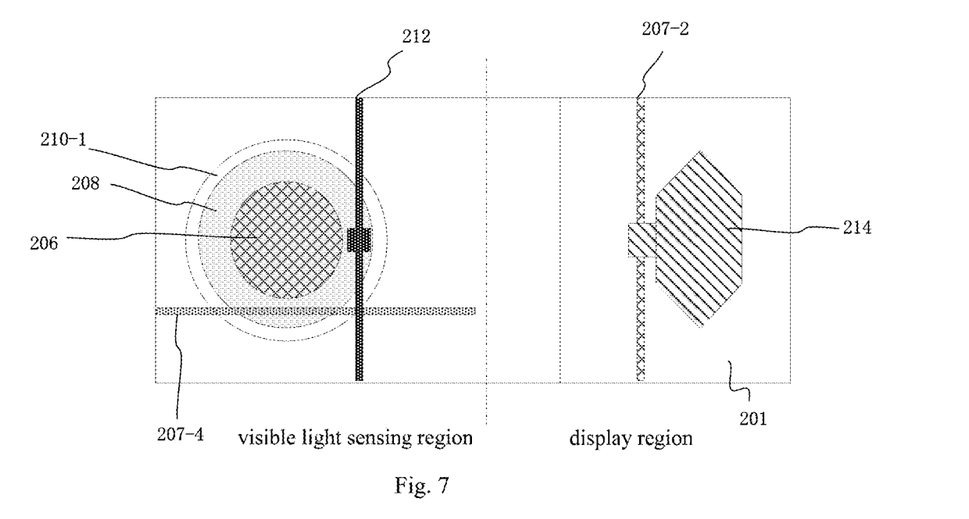
FIG. 7 is a top view of the display substrate in FIG. 5.

FIG. 7 is a top view of the display substrate in FIG. 5. As shown in FIG. 7, a top view of the protrusion structure 206 is of a circular shape, and when the protrusion structure is a hemi-ellipsoidal structure or an ellipsoidal segment structure, the top view of the protrusion structure is of an elliptical shape.

The spherical protrusion structure is formed as follows. A circular pattern or an elliptical pattern is formed through a mask, and then the spherical protrusion structure such as the hemi-spherical structure, the spherical segment structure, the hemi-ellipsoidal structure and the ellipsoidal segment structure is formed through heating. The protrusion structure is used as a spacer layer, so the first electrode, the visible light sensing layer and the second electrode formed on the protrusion structure are provided with a same protrusion, as shown in FIG. 7. Patterns of the first electrode, the visible light sensing layer and the second electrode are also circular patterns or elliptical patterns formed through masks. The first electrode 207-1 are arranged at a same layer and made of a same conductive material as the first electrode line 207-4, and a pattern of the second electrode 209 is the same as a pattern of the visible light sensing layer 208, and the second electrode 209 and the visible light sensing layer 208 is formed through a same mask. Finally, the second electrode line 212 needs to be formed as a line for the second electrode 209.

Figure 8:
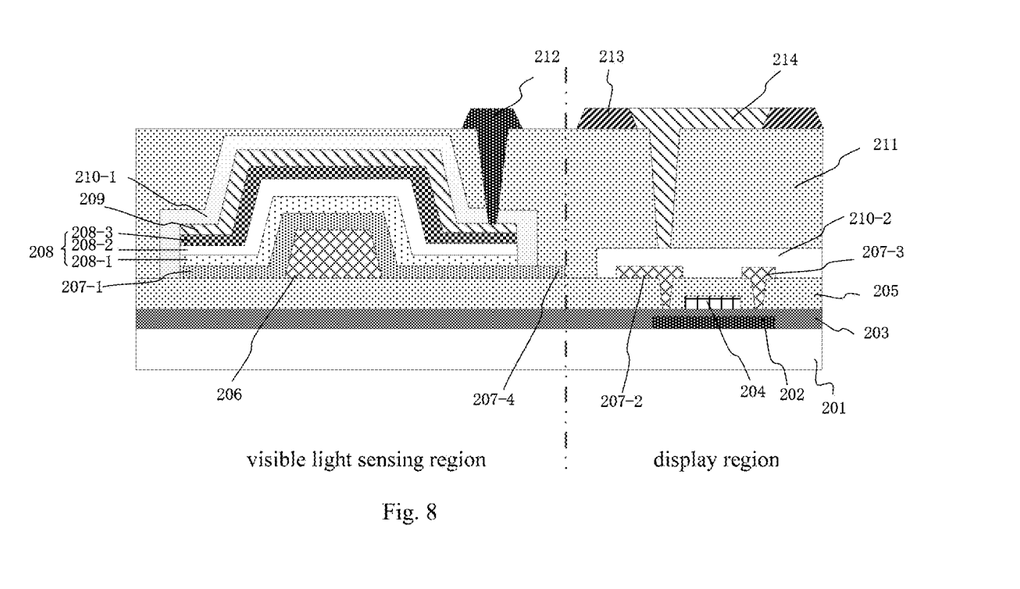
FIG. 8 is another schematic view showing the display substrate according to one embodiment of the present disclosure.

In some other embodiments of the present disclosure, the protrusion structure 206 may also be a boss structure, as shown in FIG. 8. The boss structure is a truncated pyramid, or a truncated cone. In a possible embodiment of the present disclosure, the protrusion structure 206 is made of a photosensitive organic material, and it is formed directly through a photolithography process.

Figure 9:
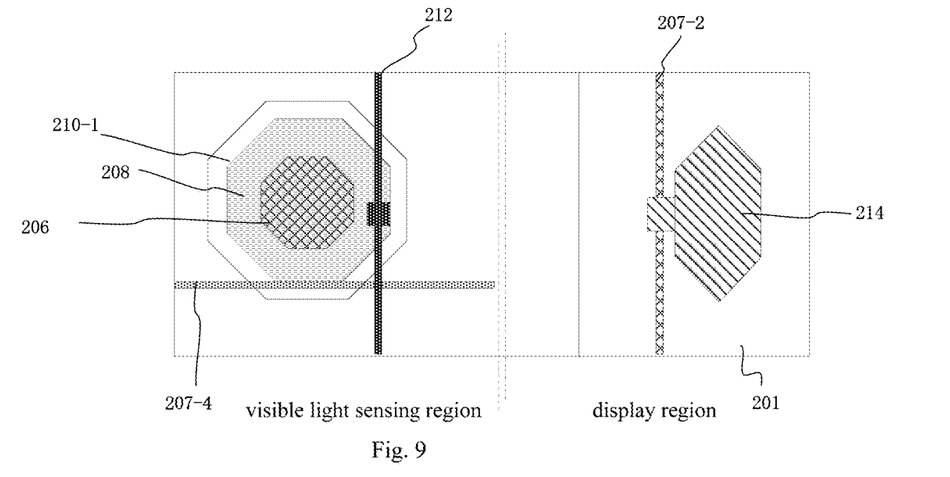
FIG. 9 is a top view of the display substrate in FIG. 8.

FIG. 9 is a top view of the display substrate in FIG. 8. As shown in FIG. 9, a top view of the protrusion structure 206 is of a rectangular shape. In some other embodiments of the present disclosure, the top view of the protrusion structure may also be of a polygonal shape or a circular shape.

The boss structure is directly formed through a mask.

In a possible embodiment of the present disclosure, an orthogonal projection of a surface of the boss structure away from the base substrate onto the base substrate is located in an orthogonal projection of a surface of the boss structure close to the base substrate onto the base substrate, and a size of the surface of the boss structure away from the base substrate is less than a size of the surface of the boss structure close to the base substrate, so as to provide each photosensitive film layer with a shape for receiving the light signals in each direction in an easier manner.

In a possible embodiment of the present disclosure, as shown in FIG. 5 and FIG. 8, the visible light communication device further includes a covering layer 210-1 covering the surface of the second electrode 209, a side surface of the second electrode 209 and a side surface of the visible light sensing layer 208, so as to protect each film layer in a better manner.

In a possible embodiment of the present disclosure, as shown in FIG. 5 and FIG. 8, the visible light communication device further includes a second electrode line 212 coupled to the second electrode 209 though a via hole penetrating through the covering layer 210-1.

In a possible embodiment of the present disclosure, the visible light communication device further includes a first electrode line (not shown) coupled to the first electrode 207-1, and as shown in FIG. 5 and FIG. 8, the first electrode line 207-4 is coupled to a part of the first electrode 207-1 not covered by the covering layer 210-1.

Figure 6:
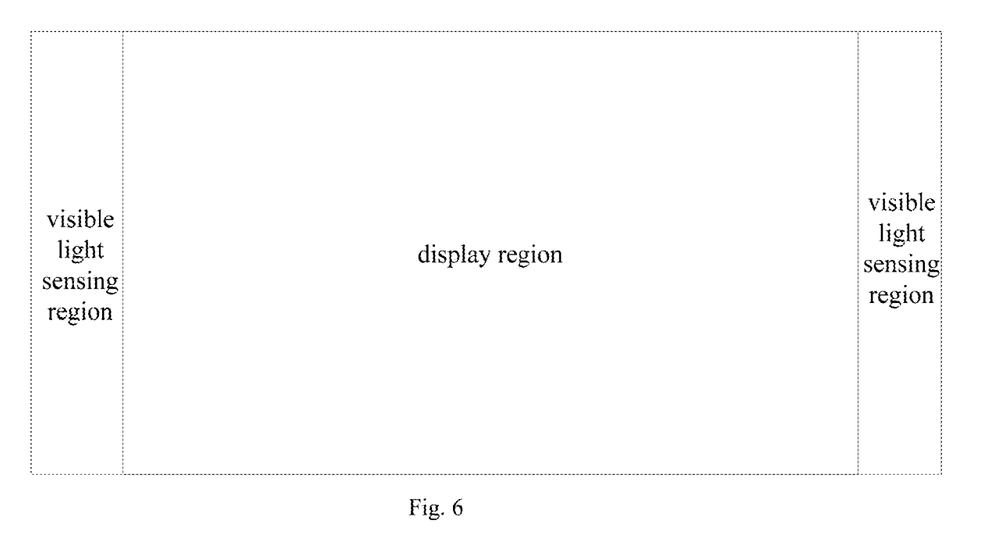
FIG. 6 is a schematic view showing positions of a display region and a visible light sensing region according to one embodiment of the present disclosure.

In a possible embodiment of the present disclosure, the base substrate 201 further includes a display region, the display region includes a plurality of sub-pixel regions. As shown in FIG. 6, the visible light sensing region surrounds the display region. In FIG. 6, the visible light sensing regions are arranged at both sides of the display region, and the visible light sensing region may also be arranged at merely one side of the display region, or surround the display region.

In a possible embodiment of the present disclosure, the base substrate further includes a display region, the display region includes a plurality of sub-pixel regions, and at least a part of the sub-pixel regions include the visible light sensing region, i.e., the visible light sensing region is located in the display region. The visible light sensing region may be arranged in each sub-pixel region or merely in a part of the sub-pixel regions, e.g., the visible light sensing region is arranged in one sub-pixel region of every 10 sub-pixel regions.

In a possible embodiment of the present disclosure, as shown in FIG. 5, the display substrate further includes: a thin film transistor arranged in the sub-pixel region and including an active layer (ACT) 202, a gate insulation layer (GI) 203, a gate electrode (Gate) 204, an interlayer dielectric layer (ILD) 205, a source electrode 207-2 and a drain electrode 207-3; a passivation layer (PVX) 210-2 arranged at a side of the thin film transistor away from the base substrate 201; a planarization layer (Resin) 211 arranged at a side of the passivation layer 210-2 away from the base substrate 201; and a pixel electrode (PE) 214 arranged at a side of the planarization layer 211 away from the base substrate 201 and coupled to the source electrode 207-2 through a via hole in the passivation layer 210-2 and the planarization layer 211. The second electrode line is arranged at a same layer and made of a same material as the pixel electrode.

In a possible embodiment of the present disclosure, the first electrode 207-1 is arranged at a same layer and made of a same material as the source electrode 207-2 and the drain electrode 207-3, i.e., the first electrode 207-1, the source electrode 207-2 and the drain electrode 207-3 are formed through a same mask, so as to reduce the manufacture cost.

In a possible embodiment of the present disclosure, the covering layer 210-1 is arranged at a same layer and made of a same material as the passivation layer 210-2, so as to reduce a thickness of each film layer and reduce the manufacture cost.

In a possible embodiment of the present disclosure, as shown in FIG. 5 and FIG. 8, the display substrate further includes a pixel definition layer (PDL) 213 for defining a plurality of sub-pixel display regions.

The present disclosure further provides in some embodiments a display device including the above-mentioned display substrate. The display device may be an Organic Light-Emitting Diode (OLED) display device or a Liquid Crystal Display (LCD) display device.

The present disclosure further provides in some embodiments a method for manufacturing a display substrate, which includes the following steps.

Step S1: providing a base substrate, the base substrate including a visible light sensing region.

Step S2: forming a visible light communication device in the visible light sensing region of the base substrate. The visible light communication device includes: a protrusion structure arranged on the base substrate and protruding toward a photosensitive side of the visible light communication device; a first electrode covering the protrusion structure; a visible light sensing layer arranged at a side of the first electrode away from the protrusion structure; and a second electrode arranged at a side of the visible light sensing layer away from the first electrode. A surface of each of the first electrode, the visible light sensing layer and the second electrode away from the base substrate is provided with a protrusion facing the photosensitive side of the visible light communication device due to the protrusion structure.

Figure 10:
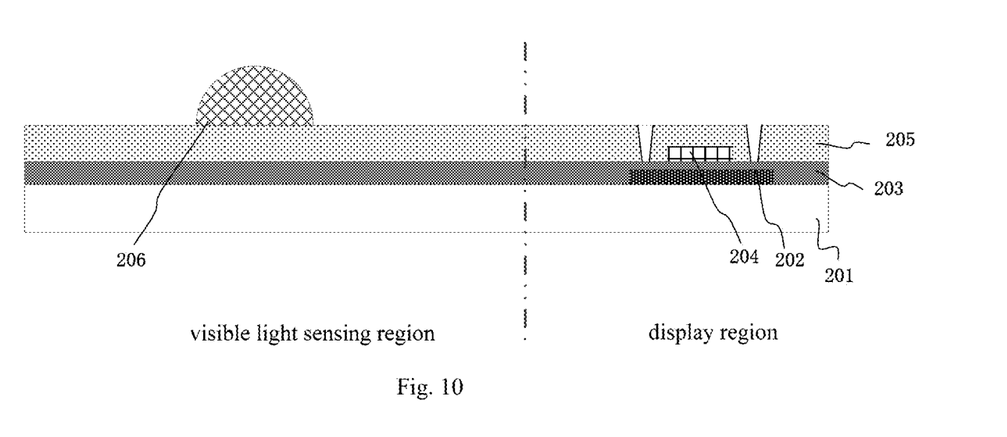
FIG. 10 to FIG. 12 are schematic views showing the manufacture of the display substrate according to one embodiment of the present disclosure.
Figure 11:
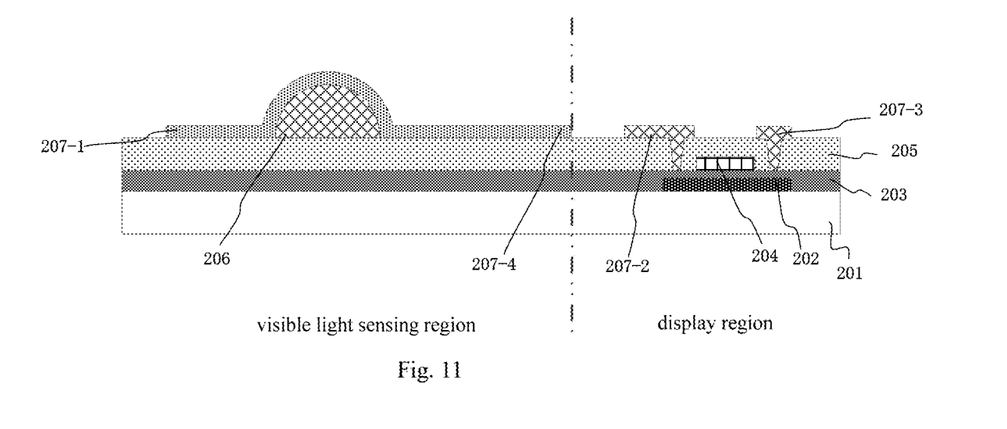
Figure 12:
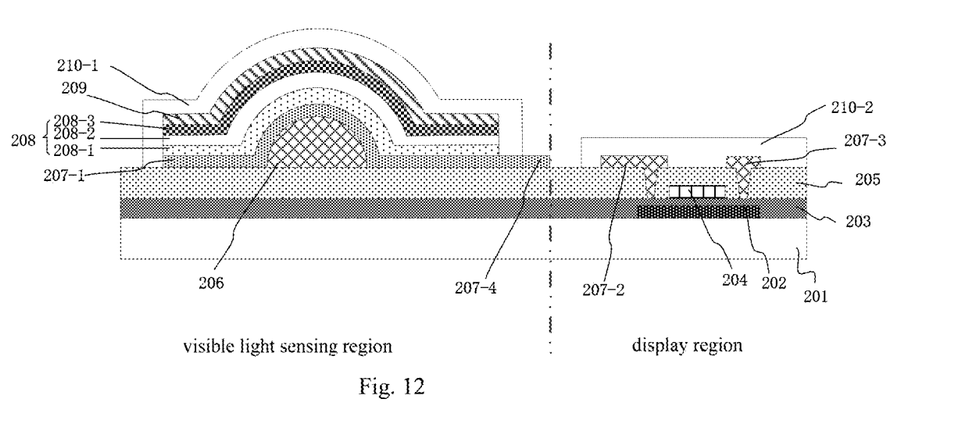

As shown in FIG. 10 to FIG. 12, the present disclosure further provides in some embodiments a method for manufacturing a display substrate, which includes the following steps.

Step S11: as shown in FIG. 10, providing a base substrate 201, the base substrate 201 including a visible light sensing region and a display region; forming an active layer 202 in the display region; forming a gate insulation layer 203 on the active layer 202, the gate insulation layer 203 covering the visible light sensing region and the display region; forming a gate electrode 204 on the gate insulation layer 203, the gate electrode 204 being located in the display region; forming an interlayer dielectric layer 205 on the gate electrode 204, the interlayer dielectric layer 205 covering the visible light sensing region and the display region; and forming a via hole penetrating through the interlayer dielectric layer 205, the via hole being located in the display region.

Step S12: coating a spacer layer material on a whole surface of the interlayer dielectric layer 205; forming a spacer layer material pattern in the visible light sensing region through exposing and developing; and enabling the spacer layer material pattern to flow through a heating process to form the protrusion structure 206.

Step S13: as shown in FIG. 11, forming a source/drain metal layer pattern, the source/drain metal layer including a source electrode 207-2 and a drain electrode 207-3 located in the display region, and a first electrode 207-1 of the visible light communication device located in the visible light sensing region, i.e., the first electrode 207-1, and the source electrode 207-2 and the drain electrode 207-3 of the visible light communication device being formed through a same mask, so as to reduce the quantity of masks and the manufacture cost. Of course, when there are special electrical requirements on the visible light communication device, the first electrode 207-1 may be made of a metal different from the source electrode 207-2 and the drain electrode 207-3, i.e., the metal layers are deposited and patterned twice.

Step S14: as shown in FIG. 12, depositing the N-type doped layer 208-1, the intrinsic layer 208-2 and the P-type doped layer 208-3 of the visible light communication device in the visible light sensing region, depositing the second electrode 209, performing a patterning process after depositing the film layers to form the visible light communication device, and then depositing the covering layer 210-1 to protect the visible light communication device. The covering layer 210-1 and the passivation layer 210-2 in the display region are both inorganic film layers, so the covering layer 210-1 and the passivation layer 210-2 may be deposited at one time, so as to reduce the quantity of process steps and the manufacture cost.

Step S15: depositing a planarization layer to cover the visible light sensing region and the display region, forming a via hole through exposure and developing, and then depositing a metal layer to form a second electrode line. The metal layer in the visible light sensing region is made of a same metal as the pixel electrode in the display region, so as to deposit a metal film layer at one time, reduce the quantity of process steps, and reduce the manufacture cost. Finally, a pixel definition layer in a pixel peripheral region of the display region is formed to obtain the display substrate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for manufacturing a display substrate, comprising:
    providing a base substrate, the base substrate comprising a visible light sensing region; and
    forming a visible light communication device in the visible light sensing region of the base substrate, the visible light communication device comprising: a protrusion structure arranged on the base substrate and protruding toward a photosensitive side of the visible light communication device; a first electrode covering the protrusion structure; a visible light sensing layer arranged at a side of the first electrode away from the protrusion structure; and a second electrode arranged at a side of the visible light sensing layer away from the first electrode,
    wherein a surface of each of the first electrode, the visible light sensing layer and the second electrode away from the base substrate is provided with a protrusion facing the photosensitive side of the visible light communication device due to the protrusion structure;
    wherein the first electrode covers an entire surface of the protrusion structure and an entire side surface of the protrusion structure;
    wherein the protrusion structure is a spherical protrusion structure, and the forming the protrusion structure comprises:

coating a spacer layer material on a whole surface of an interlayer dielectric layer;

forming a spacer layer material pattern in the visible light sensing region through exposure and developing; and enabling the spacer layer material pattern to flow through a heating process to form the protrusion structure.

2. The method for manufacturing a display substrate according to claim 1, wherein the spherical protrusion structure is one of a hemi-spherical structure, a spherical segment structure, a hemi-ellipsoidal structure, or an ellipsoidal segment structure.

3. The method for manufacturing a display substrate according to claim 1, wherein the base substrate further comprises a display region, the display region comprises a plurality of sub-pixel regions, and the visible light sensing region surrounds the display region.

4. The method for manufacturing a display substrate according to claim 1, wherein the base substrate further comprises a display region, the display region comprises a plurality of sub-pixel regions, and at least a part of the sub-pixel regions comprise the visible light sensing region.

5. The method for manufacturing a display substrate according to claim 3, wherein the display substrate further comprises:

a thin film transistor arranged in the sub-pixel region and comprising an active layer, a gate insulation layer, a gate electrode, an interlayer dielectric layer, a source electrode and a drain electrode;

a passivation layer arranged at a side of the thin film transistor away from the base substrate;

a planarization layer arranged at a side of the passivation layer away from the base substrate; and a pixel electrode arranged at a side of the planarization layer away from the base substrate and coupled to the source electrode through a via hole in the passivation layer and the planarization layer, wherein the first electrode is arranged at a same layer and made of a same material as the source electrode and the drain electrode.

6. The method for manufacturing a display substrate according to claim 4, wherein the display substrate further comprises:

a thin film transistor arranged in the sub-pixel region and comprising an active layer, a gate insulation layer, a gate electrode, an interlayer dielectric layer, a source electrode and a drain electrode;

a passivation layer arranged at a side of the thin film transistor away from the base substrate;

a planarization layer arranged at a side of the passivation layer away from the base substrate; and a pixel electrode arranged at a side of the planarization layer away from the base substrate and coupled to the source electrode through a via hole in the passivation layer and the planarization layer, wherein the first electrode is arranged at a same layer and made of a same material as the source electrode and the drain electrode.

7. The method for manufacturing a display substrate according to claim 5, wherein the visible light communication device further comprises a covering layer covering the surface of the second electrode, a side surface of the second electrode and a side surface of the visible light sensing layer, wherein the covering layer is arranged at a same layer and made of a same material as the passivation layer.

8. The method for manufacturing a display substrate according to claim 5, wherein the visible light communication device further comprises a second electrode line arranged at a side of the planarization layer away from the base substrate and coupled to the second electrode through a second via hole in the planarization layer, wherein the second electrode line is arranged at a same layer and made of a same material as the pixel electrode.

* * * * *